(12) United States Patent
Shimura

(10) Patent No.: US 7,761,737 B2
(45) Date of Patent: Jul. 20, 2010

(54) APPARATUS, METHOD, AND COMPUTER PRODUCT FOR EXECUTING PROGRAM

(75) Inventor: Kouya Shimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1133 days.

(21) Appl. No.: 11/214,839

(22) Filed: Aug. 31, 2005

(65) Prior Publication Data

US 2006/0224915 A1 Oct. 5, 2006

(30) Foreign Application Priority Data

Mar. 29, 2005 (JP) ............................. 2005-094505

(51) Int. Cl.
*G06F 11/00* (2006.01)
(52) U.S. Cl. ............................................ 714/7; 714/6
(58) Field of Classification Search ...................... 714/6, 714/7, 8
See application file for complete search history.

(56) References Cited

U.S. PATENT DOCUMENTS

| | | | | |
|---|---|---|---|---|
| 6,240,486 B1 * | 5/2001 | Ofek et al. | ................... | 711/112 |
| 6,629,266 B1 * | 9/2003 | Harper et al. | ................... | 714/38 |
| 6,631,493 B2 * | 10/2003 | Ottesen et al. | ............... | 714/774 |
| 6,938,137 B2 * | 8/2005 | Fujibayashi et al. | ......... | 711/162 |
| 6,978,398 B2 * | 12/2005 | Harper et al. | ................. | 714/13 |
| 7,007,141 B2 * | 2/2006 | Li et al. | ....................... | 711/162 |
| 7,143,307 B1 * | 11/2006 | Witte et al. | .................... | 714/6 |
| 7,149,859 B2 * | 12/2006 | Fujibayashi | .................. | 711/162 |
| 7,155,635 B1 * | 12/2006 | Phelps | ........................... | 714/6 |
| 7,321,990 B2 * | 1/2008 | Zimmer et al. | ................. | 714/42 |
| 2003/0126327 A1 * | 7/2003 | Pesola et al. | .................. | 710/74 |
| 2003/0182525 A1 * | 9/2003 | O'Connell et al. | .......... | 711/162 |

FOREIGN PATENT DOCUMENTS

| | | |
|---|---|---|
| JP | 7-234808 | 9/1995 |
| JP | 2001-290677 | 10/2001 |
| JP | 2003-345613 | 12/2003 |
| JP | 2005-70952 | 3/2005 |

OTHER PUBLICATIONS

Japanese Patent Office Action, mailed Apr. 8, 2008 and issued in corresponding Japanese Patent Application No. 2005-094505.

* cited by examiner

*Primary Examiner*—Joshua A Lohn
(74) *Attorney, Agent, or Firm*—Staas & Halsey LLP

(57) ABSTRACT

An operating computer or a standby computer can execute a program. The operating computer includes a first storage unit and the standby computer includes a second storage unit. Access to the first storage unit is frozen. Only minimum data required for the standby computer to execute the program that was executed by the operating computer is transferred from the first storage unit to the second storage unit. Other data in the first storage unit is transferred to the second storage unit only when required.

14 Claims, 7 Drawing Sheets

MIGRATE

APPARATUS, METHOD, AND COMPUTER PRODUCT FOR EXECUTING PROGRAM

BACKGROUND OF THE INVENTION

1. Field of the Invention

The present invention relates to a technology for extracting a snapshot from data stored in a storage unit of a program executing apparatus.

2. Description of the Related Art

When a failure occurs in a server system, dump information including data used at the time of the failure is extracted from a memory or a virtual memory, and is saved into a storage unit such as a magnetic disk.

However, the server system can only be recovered after saving all of the dump information stored in the memory in the storage unit. Accordingly, the server system cannot immediately resume a service.

Japanese Patent Application Laid Open No. 2001-290677 discloses an operation server and a standby server. When a failure occurs in the operation server, dump information of the operation server is sent to the standby server. The standby server is used to stores the dump information and also to recover the operation server.

Japanese Patent Application Laid Open No. H7-234808 discloses a redundant main memory in a server. When a failure occurs in the server, the redundant main memory is partitioned into two main memories. One main memory is used to recover the server, while the other main memory is used to retain dump information.

However, the problem with the conventional technology is that data in a memory cannot be efficiently extracted at an arbitrary timing.

Specifically, in the technology disclosed in Japanese Patent Application Laid Open No. 2001-290677, the dump information stored in the operation server needs to be sent back to the standby server. If there is a delay in sending the dump information, the recovery of the operation server is also delayed.

In the technology disclosed in Japanese Patent Application Laid Open No. H7-234808, the redundant main memory is partitioned after the dump information is acquired. Accordingly, to acquire dump information again at an arbitrary timing, the partitioned memories need to be made redundant again. This requires a significant amount of time and cost.

SUMMARY OF THE INVENTION

It is an object of the present invention to at least solve the problems in the conventional technology.

An apparatus for storing data in a storage unit and executing a program according to one aspect of the present invention includes a freezing unit that freezes access to the storage unit; and a migrating unit that migrates data stored in the storage unit to at least one other apparatus to cause the other apparatus to execute a program that was executed by the apparatus.

A method for causing an operating computer or a standby computer to execute a program according to another aspect of the present invention, the operating computer and the standby computer each including a storage unit for storing data, includes freezing access to the storage unit of the operating computer; and migrating data stored in the storage unit of the operating computer to the standby computer to cause the standby computer to execute a program that was executed by the operating computer.

A computer-readable recording medium according to another aspect of the present invention stores therein a computer program that implements a method according to the present invention on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

Figure 1:
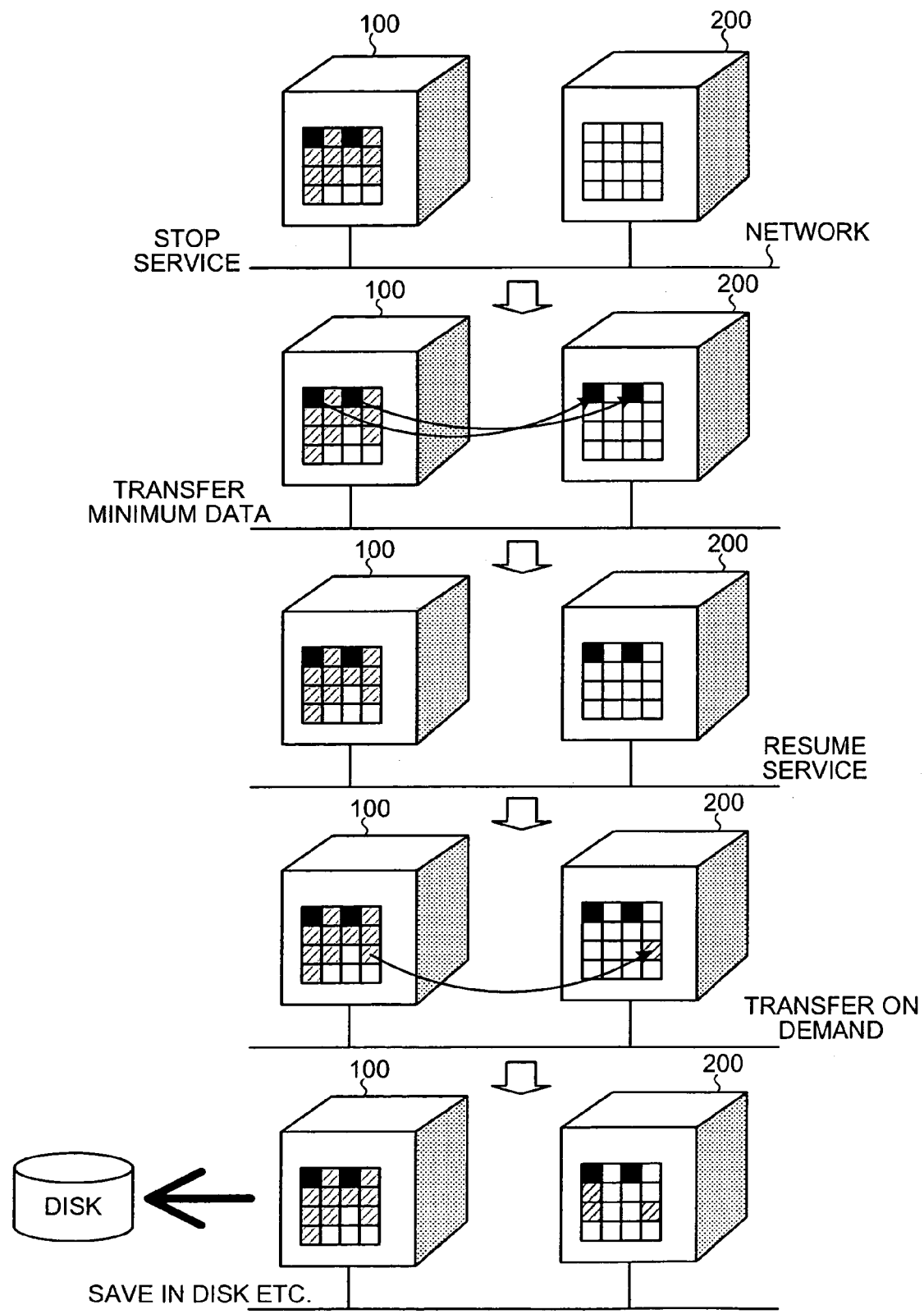
FIG. 1 is a diagram for describing a concept of a system according to an embodiment of the present invention.

FIG. 1 is a diagram for describing a concept of a system according to an embodiment of the present invention. In the system, a server 100 and a server 200 are connected to a network.

When data recorded in a memory of the server 100 is extracted as a snapshot at an arbitrary timing, the server 100 temporarily suspends providing a service. The server 100 transfers minimum data required for providing the service from the memory to the server 200, so that the server 200 can provide the service in place of the server 100.

When a page fault occurs while the server 200 is providing the service, the server 200 requests (on demand) corresponding data from the server 100, to supplement missing data. The server 100 extracts a snapshot, and saves the snapshot in a hard disk.

When a snapshot is extracted from the server 100, the server 100 transfers minimum data to the server 200, so that the server 200 immediately starts providing the service that the server 100 was providing. Thus, the snapshot can be efficiently extracted at an arbitrary timing. Furthermore, the service is suspended for an extremely short length of time, and therefore, a snapshot can be frequently extracted.

Moreover, while the server 200 is providing the service in place of the server 100, the server 100 can take time to record a snapshot without fail.

Figure 2:
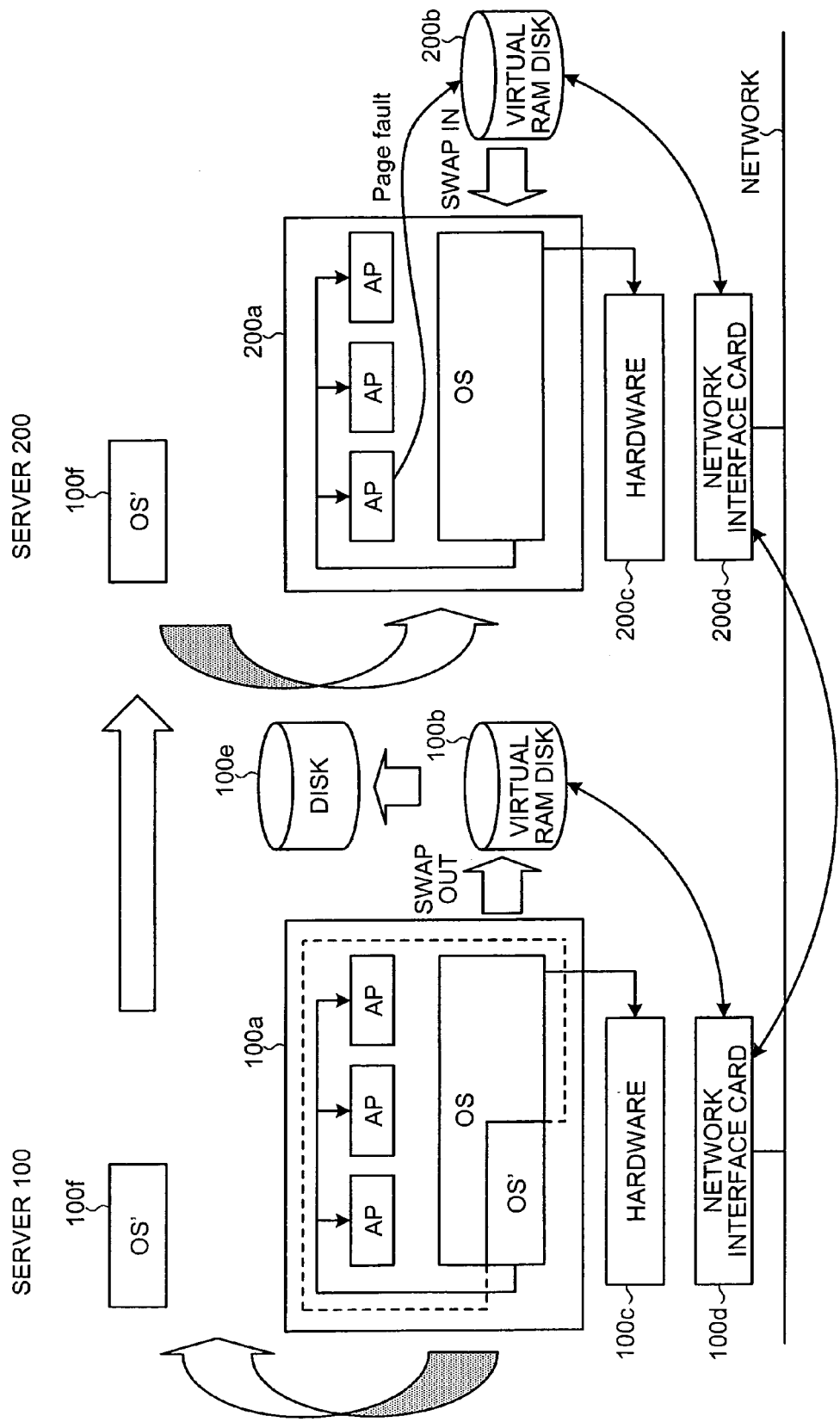
FIG. 2 is a diagram for describing migration from a server 100 to a server 200 when a snapshot is extracted.

FIG. 2 is a diagram for describing migration between the server 100 and the server 200 when a snapshot is extracted. When a snapshot is extracted, the server 100 suspends a process, uses a suspend function to swap out data from a memory 100*a* (excluding an area from which data cannot be swapped out) to a virtual random access memory (RAM) disk 100*b*, and suspends hardware 100*c*.

Data of the virtual RAM disk 100*b* is actually stored in a storage unit (memory) in the server 100. The virtual RAM disk 100b only manages a location where data is stored (offset in a disk) and a page table that contains an address of the memory. The memory is not actually transferred, and therefore, the swap-out processing is performed instantaneously.

The server 100 creates a snapshot (hereinafter, "OS snapshot 100f") including minimum data required to operate an operating system (OS) (including data of a kernel), resumes the hardware 100c, transfers the OS snapshot 100f to the server 200, and changes an internet protocol (IP) address of the server 100.

When the OS snapshot 100f is received, the server 200, stores the OS snapshot 100f in a memory 200a, and resumes the suspended process with the OS snapshot 10f.

When a page fault occurs after the process is resumed by the server 200, the server 200 requests the corresponding page from the server 100 (hereinafter, "page request"). The server 100 searches the virtual RAM disk 100b for the requested page, and transfers the page to the server 200.

When the page is received from the server 100, the server 200 swaps the page in the memory 200a through a virtual RAM disk 200b. The server 100 saves the data stored in the virtual RAM disk 100b into a disk 100e as a snapshot.

The server 100 swaps out data in the memory 100a to the virtual RAM disk 100b, and suspends the OS using the suspend function. The server 200 uses a resume function to resume execution of the OS, and swaps in data through the virtual RAM disk 200b. Migration from the server 100 to the server 200 is thus performed. Thus, the OS does not require a new function to perform the migration as in the conventional technology, and reliability of the migration is enhanced.

Figure 3:
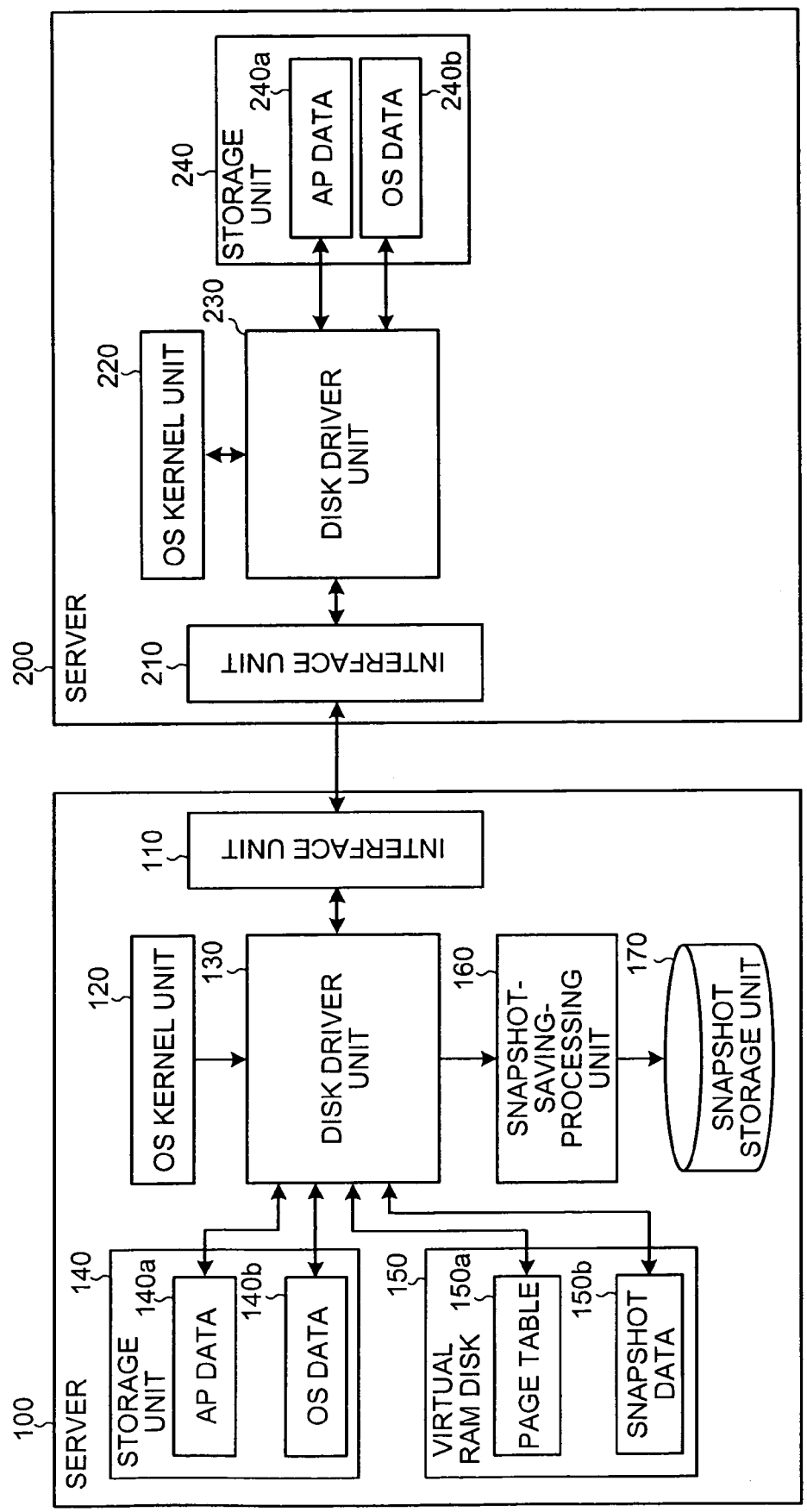
FIG. 3 is a functional block diagram of the server 100 and the server 200.

FIG. 3 is a functional block diagram of the server 100 and the server 200. The server 100 includes an interface unit 110, an OS kernel unit 120, a disk driver unit 130, a storage unit 140, a virtual RAM disk 150, a snapshot-saving-processing unit 160, and a snapshot storage unit 170. The server 200 includes an interface unit 210, an OS kernel unit 220, a disk driver unit 230, and a storage unit 240.

The interface unit 110 uses a predetermined communication protocol to communicate with the server 200. The OS kernel unit 120 makes a data write/read request or a swap out request to the disk driver unit 130.

The disk driver unit 130 swaps out data stored in the storage unit 140 to the virtual RAM disk 150, and migrates the swapped out data to the server 200.

Specifically, the disk driver unit 130 receives, from the OS kernel unit 120, a request to swap out application (AP) data 140a and OS data 140b stored in the storage unit 140. At this time, the disk driver unit 130 only receives the request and does not immediately perform a processing. The AP data 140a is data for executing a predetermined application program, and the OS data 140b is data for executing a program of the OS.

The disk driver unit 130 purposely does not notify the OS kernel unit 120 that the swap out processing is completed. During this time, access to the storage unit 140 is frozen, so that the AP data 140a and the OS data 140b are not overwritten.

The disk driver unit 130 does not transfer all of the data stored in the storage unit 140 to the server 200. Using the technology disclosed in nonpatent literature "ACM Computing Survey, Vol. 32, No. 3, September 2000, pp. 241-299), the disk driver unit 130 creates, from the OS data 140b, a snapshot (OS snapshot) corresponding to minimum data required to execute the OS. The disk driver unit 130 then transfers the OS snapshot to the server 200. The OS snapshot is recorded as snapshot data 150b in the virtual RAM disk 150, to subsequently be saved in the snapshot storage unit 170.

When a page request is received from the server 200, the disk driver unit 130 specifies an address of the requested page from a page table 150a in the virtual RAM disk 150, and transfers the page located at the address to the server 200. The page table 150a is a table including addresses for each page that is swapped out.

The snapshot storage unit 170 stores a snapshot created by the snapshot-saving-processing unit 160. The snapshot-saving-processing unit 160 creates a snapshot from the snapshot data 150b, and stores the created snapshot and the data in the storage unit 140 into the snapshot storage unit 170.

The interface unit 210 uses a predetermined communication protocol to communicate with the server 100. The OS kernel unit 220 makes a data write/read request or a swap out request to the disk driver unit 230.

The disk driver unit 230 receives a swap in request from the OS kernel unit 220 when a page fault occurs, requests the corresponding page from the server 100, and swaps the page in the storage unit 240.

When an OS snapshot is received from the server 100, the disk driver unit 230 stores the OS snapshot in the storage unit 240 as OS data 240b, starts a process with the OS data 240b, and provides the service that was provided by the server 100.

Before the server 200 starts providing the service, the disk driver unit 230 instructs the OS kernel unit 220 to cancel the swap out request. This is to cancel the swap out request still remaining in the OS snapshot received from the server 100.

Furthermore, the disk driver unit 230 nullifies all of the pages swapped out to the virtual RAM disk 150 in the server 100. Accordingly, when the server 200 accesses a page that is not transferred to the storage unit 240, a page fault occurs, so that a swap in request is made.

When a swap in request is received, the disk driver unit 230 requests a corresponding page from the server 100. When the page is received from the server 100, the disk driver unit 230 stores (swaps in) data of the page in the storage unit 240. When the data is swapped in, the disk driver unit 230 notifies the OS kernel unit 220 that the swap in processing is completed.

Figure 4:
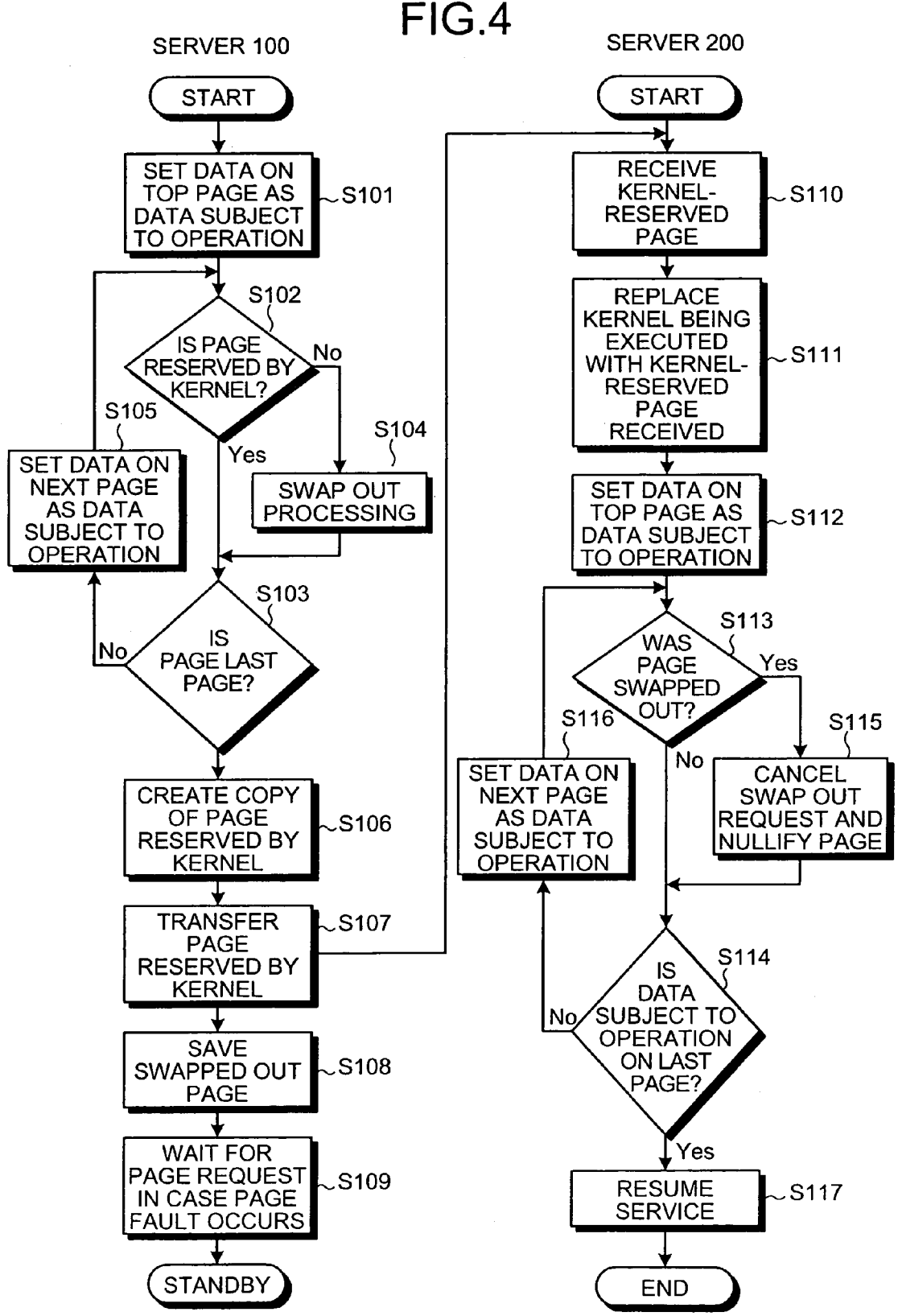
FIG. 4 is a flowchart of a processing performed by the server 100 and the server 200, from extracting a snapshot to resuming a service.

FIG. 4 is a flowchart of a processing performed by the server 100 and the server 200, from extracting a snapshot to resuming the service.

When the disk driver unit 130 receives a swap out request from the OS kernel unit 120, the server 100 sets data on a top page as data subject to operation (step S101), and determines whether the page is reserved by the kernel as an indispensable page for executing the OS (step S102).

If the page is reserved by the kernel (Yes at step S102), the server 100 determines whether the page is a last page (step S103). On the other hand, if the page is not reserved by the kernel (No at step S102), the page is swapped out to the virtual RAM disk 150 (step S104), and the system control proceeds to step S103.

If the page is not a last page (No at step S103), data on a next page is set as data subject to operation (step S105), and the system control returns to step S102. On the other hand, if the page is a last page (Yes at step S103), the server 100 creates a copy of the page reserved by the kernel (step S106), and transfers the page reserved by the kernel (OS snapshot) to the server 200 (step S107).

The snapshot-saving-processing unit 160 saves the page swapped out at step S104 in the snapshot storage unit 170 (step S108), and the disk driver unit 130 switches to a standby status to wait for a page request from the server 200 in case a page fault occurs (step S109).

When the disk driver unit 230 receives the kernel-reserved page (step S110), the server 200 replaces a kernel being executed in the server 200 with the kernel-reserved page received from the server 100 (step S111). The server 200 sets data at a top page as data subject to operation (step S112), and determines whether the top page was swapped out (step S113).

If the page was not swapped out (No at step S113), the server 200 determines whether the page is a last page (step S114). On the other hand, if the page was swapped out (Yes at step S113), the server 200 cancels the swap out request and nullifies the page (step S115), and the system control proceeds to step S114.

If the page is not a last page (No at step S114), data on a next page is set as data subject to operation (step S116), and the system control returns to step S113. On the other hand, if the page is a last page (Yes at step S114), the server 200 resumes the service performed by the server 100 (step S117).

Figure 5:
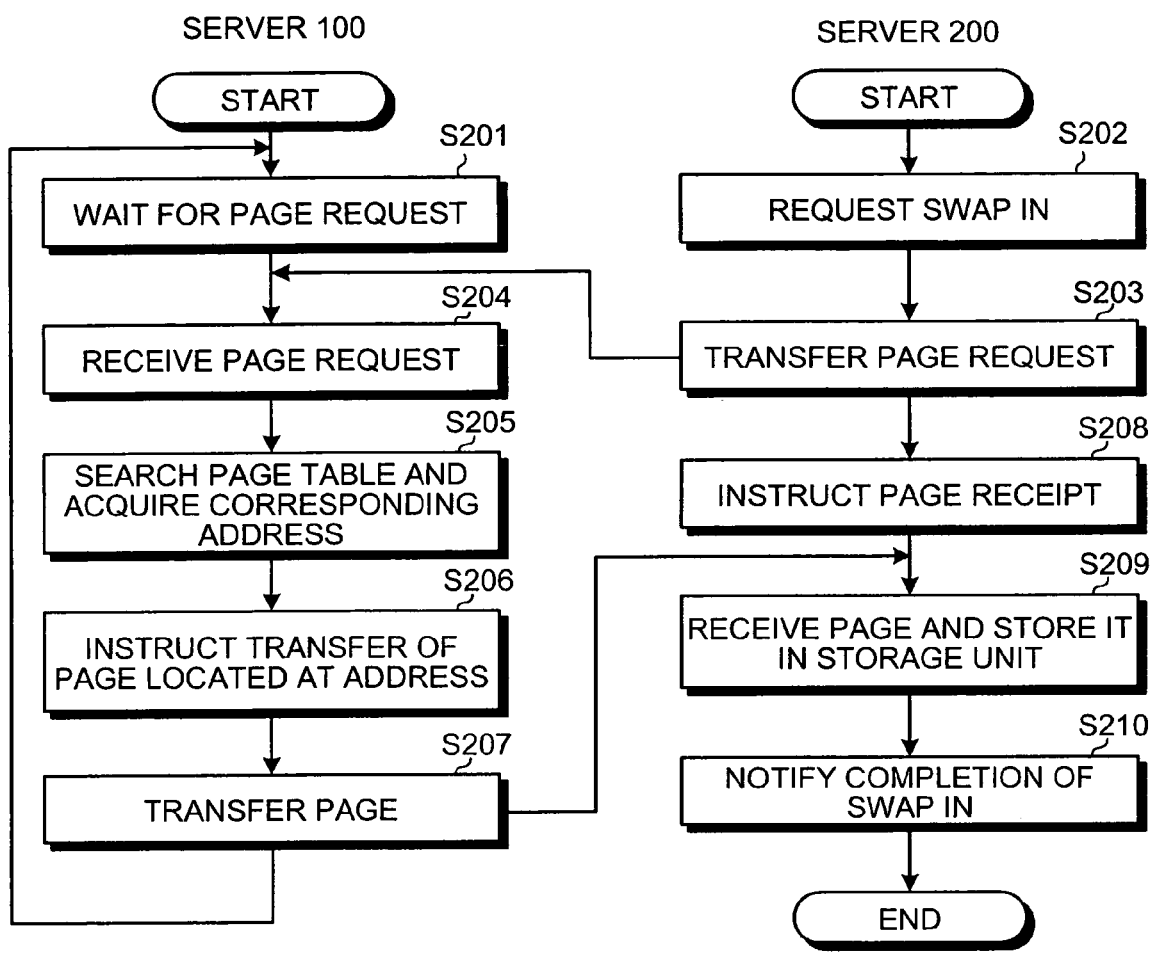
FIG. 5 is a flowchart of a processing performed by the server 100 and the server 200, after resuming the service.

FIG. 5 is a flowchart of a processing performed by the server 100 and the server 200, after resuming the service.

In the server 100, the disk driver unit 130 waits for a page request from the server 200 (step S201). In the server 200, the disk driver unit 230 receives a swap in request from the OS kernel unit 220 (step S202), and when a page fault occurs, the server 200 makes a page request to the server 100 (step S203).

When the page request is received (step S204), the disk driver unit 130 searches the page table 150a for a corresponding address (step S205), makes an instruction to transfer a page located at the address (step S206), and transfers the page to the server 200 (step S207).

After step S203, the server 200 makes an instruction to receive the page (step S208). The disk driver unit 230 receives the page and stores the page in the storage unit 240 (step S209). When the page is swapped in, the disk driver unit 230 notifies the OS kernel unit 220 that the swap in processing is completed (step S210).

The disk driver unit 130 creates a snapshot of the kernel-reserved pages transfers the created snapshot to the server 200 so that the server 200 can provide the service that was provided by the server 100. The remaining pages are transferred to the server 200 on demand. The snapshot data 150b stored in the virtual RAM disk 150 and the frozen data in the storage unit 140 are saved into the snapshot storage unit 170 by the snapshot-saving-processing unit 160.

Thus, a snapshot can be efficiently extracted at an arbitrary timing.

In conventional cases, to return to a state before a snapshot was extracted, the server 100 needed to read the snapshot from a disk, and expand the snapshot in the storage unit 140. However, in the present invention, the server 100 is only required to release the frozen access to the storage unit 140.

In the embodiment, the disk driver unit 130 uses a copy on reference (COR) method for migrating to the server 200, to which the present invention is not limited. A precopy method can be used to perform the migration.

The precopy method is performed as follows. While the server 100 is providing a service, the disk driver unit 130 transfers data stored in the storage unit 140 to the server 200 in units of pages. When performing migration, if there is a page in the storage unit 140 that changed after being transferred to the server 200, only the changed page is transferred to the server 200. Thus, the server 200 can efficiently start providing the service provided by the server 100.

In the present invention, migration is performed from the server 100 to the server 200 to extract a snapshot in the server 100. However, an OS can migrate across more than two servers and leave a snapshot in each server, so as to reproduce a past state of an arbitrary timing.

Figure 6:
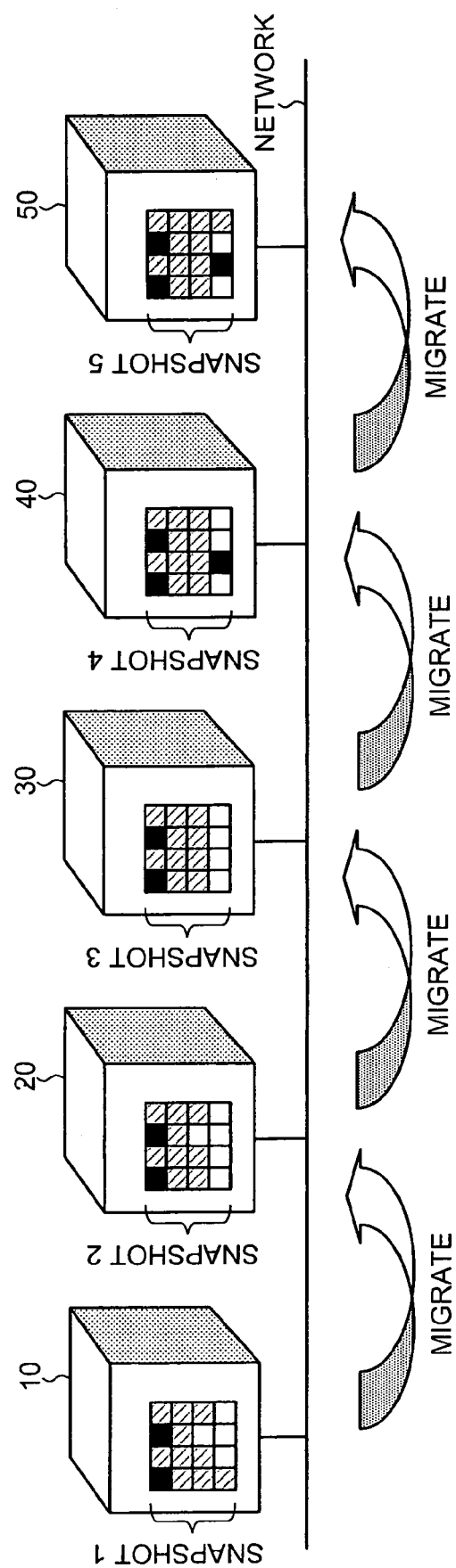
FIG. 6 is a diagram for describing a method of extracting a plurality of snapshots from a plurality of servers.

FIG. 6 is a diagram for describing a method of extracting a plurality of snapshots from a plurality of servers.

In this example, five servers 10 to 50 are provided. Every day, a snapshot is extracted from a server, so that a server can immediately return to a state of any arbitrary number of days ago.

Specifically, on a first day, a snapshot 1 is extracted by migrating data from the server 10 to the server 20; on a second day, a snapshot 2 is extracted by migrating data from the server 20 to the server 30; on a third day, a snapshot 3 is extracted by migrating data from the server 30 to the server 40; and on a fourth day, a snapshot 4 is extracted by migrating data from the server 40 to the server 50. For example, the server can immediately return to the state of the first day by using the snapshot 1.

Figure 7:
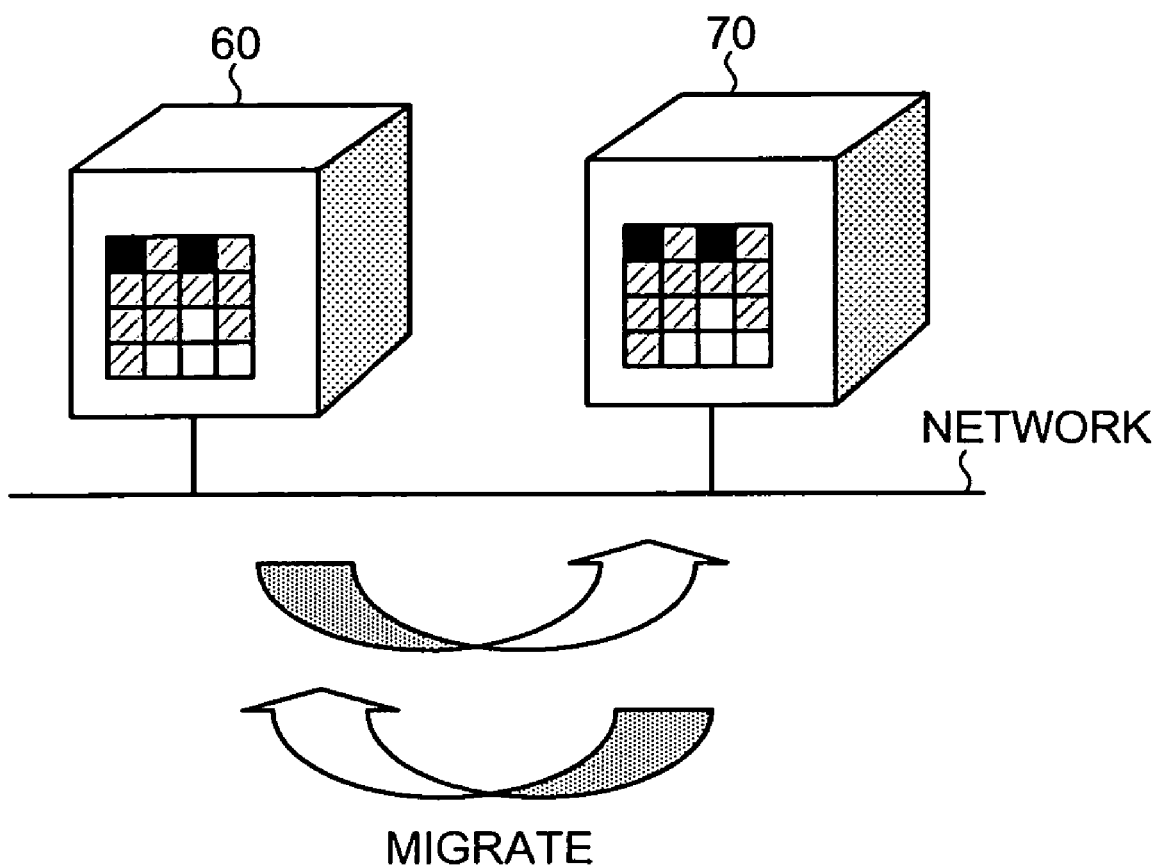
FIG. 7 is a diagram for describing a method of extracting a plurality of snapshots from two servers.

FIG. 7 is a diagram for describing a method of performing migration mutually between two servers to extract a plurality of snapshots. Specifically, when data in a server 60 is migrated to a server 70 to extract a snapshot, a driver releases frozen access to a storage unit of the server 60 (notifies an OS kernel unit that a swap out request has been fulfilled).

In another example, an OS is migrated from a first server to a plurality of servers, and a virtual-RAM-disk driver transfers a snapshot from the first server to the plurality of servers. Accordingly, in an event of a failure in the first server, a plurality of users can investigate the failure.

Thus, migration can be performed without delaying a service.

Furthermore, a program being executed by a device can immediately be executed by another device.

Moreover, migration can be performed only by adding a function to a disk driver; a new function need not be added to an OS.

Furthermore, migration can be performed without delaying a service, and a snapshot of an arbitrary timing can be efficiently extracted.

Moreover, a program being executed by an operating computer can immediately be executed by a standby computer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server that provides service, comprising:
a storage unit that stores data including operating system data;
a virtual RAM disk;
a disk drive unit upon receiving a swap out request, that
freezes access to the storage unit,
generates an operating system snap shot minimally required to operate an operating system operated by the server based on the operating system data stored in the storage unit,
migrates the operating system snap shot to another server, and
stores the operating system snap shot in the virtual RAM disk;
a snap shot storing unit; and
a saving processing unit that stores the operating system snap shot stored in the virtual RAM disk and the data in the storage unit to which access has been frozen, together as a snap shot, into the snap shot storing unit, wherein when the disk drive unit receives from the another server a request for a page corresponding to a page fault that occurs as the another server, based on the operating system snap shot migrated from the server, provides the service that has been provided by the server, the disk drive unit migrates the page from the server to the another server.

2. The server according to claim 1, wherein the disk drive unit only transfers minimum data required for executing a program to the another server, and transfers data remaining in the storage unit to the another server according to a data request made by the another server.

3. The server according to claim 1, further comprising an operating system kernel unit that sends the swap out request to the disk drive unit, wherein the disk drive unit freezes access to the storage unit by not notifying the operating system kernel unit that the data has been swapped out.

4. The server according to claim 1, wherein the disk drive unit transfers some data stored in the storage unit to the another server while executing the program, and transfers only data that changed after being transferred to the another server when causing another server to execute the program.

5. A method for a first server or a second server to execute a process, comprising:
    storing data including operating system data in a storing unit of the first server;
    upon receiving a swap out request at the first server,
        freezing access to the storage unit at the first server,
        generating at the first server an operating system snap shot minimally required to operate an operating system operated by the first server based on the operating system data stored in the storage unit,
        migrating from the first server the operating system snap shot to the second server, and
        storing the operating system snap shot in a virtual RAM disk of the first server;
    storing the operating system snap shot stored in the virtual RAM disk and the data in the storage unit to which access has been frozen, together as a snap shot, into a snap shot storing unit of the first server, wherein,
    when receiving at the first server from the second server a request for a page corresponding to a page fault that occurs as the second server, based on the operating system snap shot migrated from the first server, provides the service that has been provided by the first server, migrating the page from the first server to the second server.

6. The method according to claim 5, wherein only minimum data required for the second server to execute a program is transferred from the first server to the second server; and
    data remaining in the storage unit of the first server is transferred to the second server according to a data request made by the second server.

7. The method according to claim 5, further comprising: sending the swap out request from an operating system kernel unit of the first server, wherein access to the storage unit of the first server is frozen by not notifying the operating system kernel unit that the data has been swapped out.

8. The method according to claim 5, further comprising:
    stopping the first server by using a suspend function;
    transferring data stored in the storage unit of the first server to a storage unit of the second server;
    resuming a program that was executed by the first server by causing the second server to execute the program with a resume function; and
    swapping in the data transferred from the storage unit of the first server into the storage unit of the second server.

9. The method according to claim 5, further comprising:
    transferring some data stored in the storage unit of the first server to the second server while the first server is executing the program; and
    transferring only data that changed after being transferred to the second server when causing the second server to execute the program.

10. A computer-readable recording medium that stores therein a computer program, the program which when executed by a computer, causes the computer to execute a process, comprising:
    storing data including operating system data in a storage unit of a first server;
    upon receiving a swap out request at the first server,
        freezing access to the storage unit at the first server,
        generating at the first server an operating system snap shot minimally required to operate an operating system operated by the first server based on the operating system data stored in the storage unit,
        migrating from the first server the operating system snap shot to a second server, and
        storing the operating system snap shot in a virtual RAM disk of the first server; and
    storing the operating system snap shot stored in the virtual RAM disk and the data in the storage unit to which access has been frozen, together as a snap shot, into a snap shot storing unit of the first server, wherein
    when receiving at the first server from the second server a request for a page corresponding to a page fault that occurs as the second server, based on the operating system snap shot migrated from the first server, provides the service that has been provided by the first server, migrating the page from the first server to the second server.

11. The computer-readable recording medium according to claim 10, wherein only minimum data required for the second server to execute a program is transferred from the first server to the second server; and
    data remaining in the storage unit of the first server is transferred to the second server according to a data request made by the second server.

12. The computer-readable recording medium according to claim 10, further comprising:
    sending the swap out request from an operating system kernel unit of the first server, wherein access to the storage unit of the first server is frozen by not notifying the operating system kernel unit that the data has been swapped out.

13. The computer-readable recording medium according to claim 10, further comprising;
    stopping the first server by using a suspend function;
    transferring data stored in the storage unit of the first server to the storage unit of the second computer;
    resuming a program that was executed by the first server by causing the second server to execute the program with a resume function; and
    swapping in the data transferred from the storage unit of the first server into the storage unit of the second server.

14. The computer-readable recording medium according to claim 10, further comprising:
    transferring some data stored in the storage unit of the first server to the standby computer while the first server is executing the program; and
    transferring only data that changed after being transferred to the second server when causing the second server to execute the program.

* * * * *